United States Patent
Uhlir-Tsang

(10) Patent No.: US 7,204,872 B2
(45) Date of Patent: **\*Apr. 17, 2007**

(54) VERSATILE WATER-SOLUBLE DYE-BASED INK-JET INKS

(75) Inventor: Linda C. Uhlir-Tsang, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/055,907

(22) Filed: Feb. 11, 2005

(65) Prior Publication Data

US 2006/0065158 A1 Mar. 30, 2006

Related U.S. Application Data

(60) Provisional application No. 60/613,787, filed on Sep. 27, 2004.

(51) Int. Cl.
*C09D 11/02* (2006.01)
*B41J 2/01* (2006.01)

(52) U.S. Cl. .............................. 106/31.49; 106/31.43; 106/31.58; 347/100

(58) Field of Classification Search ............. 106/31.49, 106/31.58, 31.43; 347/100
See application file for complete search history.

(56) References Cited

U.S. PATENT DOCUMENTS

| | | | |
|---|---|---|---|
| 5,026,425 A * | 6/1991 | Hindagolla et al. ...... 106/31.32 |
| 5,108,503 A * | 4/1992 | Hindagolla et al. ...... 106/31.47 |
| 5,356,464 A | 10/1994 | Hickman et al. |
| 5,389,132 A | 2/1995 | Davulcu et al. |
| 5,626,655 A | 5/1997 | Pawlowski et al. |
| 5,693,129 A * | 12/1997 | Lin .......................... 106/31.43 |
| 5,766,327 A | 6/1998 | Maze |
| 5,810,915 A * | 9/1998 | Nagai et al. .............. 106/31.43 |
| 5,851,274 A * | 12/1998 | Lin .......................... 106/31.43 |
| 5,882,390 A * | 3/1999 | Nagai et al. .............. 106/31.49 |
| 5,981,623 A * | 11/1999 | McCain et al. ............. 523/160 |
| 6,019,828 A | 2/2000 | Rehman |
| 6,086,198 A | 7/2000 | Shields et al. |
| 6,187,086 B1 | 2/2001 | Rehman |
| 6,224,660 B1 | 5/2001 | Stubbe et al. |
| 6,231,654 B1 * | 5/2001 | Elwakil .................... 106/31.47 |
| 6,605,337 B1 | 8/2003 | Mori et al. |
| 6,770,331 B1 * | 8/2004 | Mielke et al. .............. 427/496 |
| 6,843,838 B2 * | 1/2005 | Zimmer et al. .......... 106/31.27 |
| 2002/0025994 A1 | 2/2002 | Ishizuka et al. |
| 2003/0038869 A1 * | 2/2003 | Kaneko et al. ............. 347/100 |
| 2003/0079647 A1 | 5/2003 | Kaneko et al. |
| 2004/0155947 A1 | 8/2004 | Ozawa et al. |
| 2004/0187739 A1 * | 9/2004 | Uhlir-Tsang ............. 106/31.49 |
| 2005/0004259 A1 * | 1/2005 | Freyberg et al. ............ 523/160 |
| 2005/0142306 A1 * | 6/2005 | Uhlir-Tsang et al. .... 428/32.34 |

FOREIGN PATENT DOCUMENTS

| | | |
|---|---|---|
| EP | 0 415 581 A | 3/1991 |
| EP | 0 509 668 A | 10/1992 |
| EP | 0 853 108 A | 7/1998 |
| EP | 1 342 759 A | 9/2003 |
| EP | 1 462 488 A | 9/2004 |

* cited by examiner

*Primary Examiner*—Helene Klemanski

(57) ABSTRACT

The present invention is drawn to a pigment-free ink-jet ink and method of producing a printed image. The ink-jet ink can comprise an aqueous liquid vehicle including 1-(2-hydroxyethyl)-2-pyrrolidinone, and a colorant consisting essentially of a dye that is solubilized in the aqueous liquid vehicle.

27 Claims, No Drawings

VERSATILE WATER-SOLUBLE DYE-BASED INK-JET INKS

CLAIM OF PRIORITY

This application claims the benefit of U.S. Provisional Patent Application No. 60/613,787, filed on Sep. 27, 2004, which is incorporated by reference herein in its entirety.

FIELD OF THE INVENTION

The present invention relates generally to versatile ink-jet inks that can exhibit improved decap and recovery, desirable saturation and other color attributes, low puddling and bleed, and/or other desirable printing characteristics. More particularly, a liquid vehicle and soluble dye system is provided that exhibits many acceptable ink-jet printing characteristics, with or without the presence of other additives.

BACKGROUND OF THE INVENTION

Thermal ink-jet printers provide an effective means of propelling ink-jet inks onto various media including paper. These printers can accomplish this by using resistive heater elements for heating the ink to a boil, and propelling the ink through an overlying orifice plate. Specifically, a typical ink-jet printhead has an array of precisely formed nozzles located on a nozzle plate and attached to an ink-jet printhead substrate. The substrate incorporates an array of firing chambers that receive liquid ink (colorants dissolved or dispersed in a solvent) through fluid communication with one or more ink reservoirs. Each chamber has a thin-film resistor located opposite the nozzle so ink can collect between the firing resistor and the nozzle. Upon energizing a particular resistor element, a droplet of ink is expelled through the nozzle toward a print medium. Such printers, as typified by the Hewlett-Packard DeskJet™ and DesignJet™ printers, are desirable for use for several reasons. For example, thermal ink-jet printers have a relatively fast throughput while being relatively inexpensive to run. Additionally, these printers are relatively easy to use, and the ink is easily replaced.

There are several reasons that ink-jet printing has become a popular way of recording images on various media surfaces, particularly paper and coated media. Some of these reasons include low printer noise, capability of high-speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, new applications, etc. As new ink-jet inks are developed, there are several traditional characteristics to consider when evaluating the ink in conjunction with a printing surface or substrate. Such characteristics include edge acuity and optical density of the image on the surface, dry time of the ink on the substrate, adhesion to the substrate, lack of deviation of ink droplets, presence of all dots, resistance of the ink after drying to water and other solvents, long-term storage stability, good dot size and dot gain, color-to-color bleed alleviation, less chia, acceptable coalescence, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

In general, ink-jet inks are either dye- or pigment-based inks. Dye-based ink-jet inks can use a soluble colorant that is usually water-based to turn the media a specific color. Insoluble dyes have also been used in ink-jet ink formulations, wherein the insoluble dyes are dispersed rather than solubilized in a liquid vehicle. Such insoluble dyes can be considered to be similar to pigmented inks, which typically disperse the colorant within the liquid vehicle. In many cases, the line quality and accuracy of plots produced by insoluble colorant-based inks can be superior to that of water-soluble colorant-based inks. However, color saturation is often superior with water-soluble dye-based ink-jet inks.

As water soluble dye-based ink-jet inks have been shown to provide good color saturation, and as technology has evolved where line quality and accuracy of plots for dye-based ink-jet inks has improved, there has been increased interest in using water-soluble dye-based ink-jet inks. As such, it would be an advancement in the art to provide water-soluble dye-based ink-jet inks that are versatile, performing well under a variety of conditions.

SUMMARY OF THE INVENTION

It has been recognized that water-soluble dye-based ink-jet inks that include 1-(2-hydroxyethyl)-2-pyrrolidinone perform acceptably under a variety of printing conditions, with or without the addition of a variety of other solvents or ink-jet ink additives. In accordance with this, a pigment-free ink-jet ink can comprise an aqueous liquid vehicle including 1-(2-hydroxyethyl)-2-pyrrolidinone; and a colorant consisting essentially of a dye that is solubilized in the aqueous liquid vehicle.

In another embodiment, a method of producing a printed image can comprise jetting an aqueous pigment-free ink-jet ink from an ink-jet pen. The ink-jet ink can comprise an aqueous liquid vehicle including 1-(2-hydroxyethyl)-2-pyrrolidinone; and a colorant consisting essentially of a dye that is solubilized in the aqueous liquid vehicle.

Additional features and advantages of the invention will be apparent from the detailed description that follows, which illustrates, by way of example, features of the invention.

DETAILED DESCRIPTION OF THE PREFERRED EMBODIMENT(S)

For the purposes of promoting an understanding of the principles of the invention, reference will now be made to the exemplary embodiments, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The singular forms "a," "an," and, "the" include plural referents unless the context clearly dictates otherwise. Thus, for example, reference to "a dye" includes reference to one or more of such dyes.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 wt % to about 5 wt %" should be interpreted to include not only the explicitly recited concentration of about 0.1 wt % to about 5 wt %, but also include individual concentrations and the sub-ranges within the indicated range. Thus, included in this numerical range are individual concentrations such as 1 wt %, 2 wt %, 3 wt %, and 4 wt %, and sub-ranges such as from 0.1 wt % to 1.5 wt %, 1 wt % to 3 wt %, from 2 wt % to 4 wt %, from 3 wt % to 5 wt %, etc.

As used herein, "liquid vehicle," refers to the liquid vehicle in which a dye is solubilized to form an ink-jet ink. By "solubilized," such a dye does not necessarily have to be completely solubilized, however, in a preferred embodiment, the dye will be substantially solubilized or even miscible in the liquid vehicle, i.e. solubilized greater than 99% in the liquid vehicle. Liquid vehicles are well known in the art, and a wide variety of liquid vehicles may be used with the ink composition of the present invention. Such liquid vehicles include water and a mixture of a variety of different agents, including without limitation, organic solvents and co-solvents, buffers, biocides, chelating agents, surface-active agents (surfactants), light stabilizers, and polymers, to name a few examples.

An "ink-jet ink" or "ink composition" comprises an aqueous liquid vehicle and a dye. Because the present invention utilizes water soluble and liquid vehicle soluble dyes as its colorant, there no need for using a colorant dispersant.

When referring to saturated or unsaturated, branched or straight-chained is aliphatic groups, the term "lower" shall mean from 1 to 6 carbon atoms. When indicated, such as by direct reference or by reference to "combinations thereof," such aliphatic groups can also include other groups attached thereto. An example of such a combination includes hydroxyl lower aliphatic, which is a combination of a lower aliphatic group and a hydroxyl group.

With these definitions in mind, a pigment-free ink-jet ink in accordance with embodiments of the present invention can comprise an aqueous liquid vehicle including 1-(2-hydroxyethyl)-2-pyrrolidinone; and a colorant consisting essentially of a dye that is solubilized in the aqueous liquid vehicle.

In another embodiment, a method of producing a printed image can comprise jetting an aqueous pigment-free ink-jet ink from an ink-jet pen. The ink-jet ink can comprise an aqueous liquid vehicle including 1-(2-hydroxyethyl)-2-pyrrolidinone; and a colorant consisting essentially of a dye that is solubilized in the aqueous liquid vehicle.

In accordance with the ink-jet inks and associated methods described herein, the colorant must be dye that is solubilized in the liquid vehicle, or alternatively, must be a combination of dyes that are each solubilized in the liquid vehicle. Whether one dye is present, or multiple dyes are present, the amount of colorant in the ink-jet ink can be from 0.1 wt % to 20 wt %.

With further detail with respect to the dye, almost any water-soluble acid dye(s), direct dye(s), basic dye(s), and reactive dye(s) can be used, such as those described in the Color Index. Dyes not described in the Color Index can also be used, provided they are soluble in the liquid vehicle used in accordance with embodiments of the present invention. Though dyes in general are described herein throughout, it should be emphasized that certain dyes are not desirable for use in accordance with embodiments of the present invention. Such undesirable dyes include those having low solubility or essentially no solubility in water or in a liquid vehicle used in accordance with embodiments of the present invention, such as dye lakes and other known insoluble dyes. In certain embodiments, liquid vehicle-soluble dyes that can be used include metallized dyes and/or non-metallized dyes, depending on the specific application.

With respect to the liquid vehicle, the ink-jet ink compositions of the present invention are typically prepared in an aqueous formulation or liquid vehicle which can include water, co-solvents, surfactants, buffering agents, biocides, sequestering agents, viscosity modifiers, humectants, and/or other known additives. In one aspect of the present invention, the liquid vehicle can comprise from about 70 wt % to about 99.9 wt % by weight of the ink-jet ink composition. In another aspect, other than the colorant, liquid vehicle can also carry polymeric binders, latex particulates, and/or other solids.

As described, in addition to the 1-(2-hydroxyethyl)-2-pyrrolidinone, other co-solvents can also be included in the ink-jet compositions of the present invention. Suitable co-solvents for use in the present invention include water soluble organic co-solvents, but are not limited to alcohols, ethers, thiols, ketones, aldehydes, carboxylates, amides, and amines. More specifically, exemplary co-solvents that can be used include aliphatic alcohols, aromatic alcohols, polyhydric alcohols such as diols and triols, glycol ethers, poly(glycol)ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones.

For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkcyl ethers, propylene glycol alkcyl ethers, poly(ethylene glycol) alkylethers, higher homologs of poly(ethylene glycol) alkyl ethers, poly(propylene glycol) alkyl ethers, higher homologs of poly(propylene glycol) alkyl ethers, substituted formamides, unsubstituted formamides, substituted acetamides, and unsubstituted acetamides. More specific examples of co-solvents that can be used include, but are not limited to, 1,5-pentanediol, 2-pyrrolidone, 2-ethyl-2-hydroxymethyl-1,3-propanediol, diethylene glycol, 3-methoxybutanol, and ,1,3-dimethyl-2-imidazolidinone. Co-solvents can be added to reduce the rate of evaporation of water in the ink-jet to minimize clogging or other properties of the ink such as viscosity, pH, surface tension, optical density, and print quality. The total co-solvent concentration can range from about 0.01 wt % to about 40 wt %. In one embodiment, the total co-solvent concentration can be from about 5 wt % to about 15 wt %, and in another, the total concentration can be from 10 wt % to 40 wt %. In still another embodiment, the total concentration can be from 15 wt % to 30 wt %.

A specific type of co-solvent that can be used in conjunction with the 1-(2-hydroxyethyl)-2-pyrrolidinone includes 2-pyrrolidinone or other derivitized 2-pyrrolidinones. Examples of derivatized 2-pyrrolidinone co-solvents include compounds where one or more hydrogen atom(s) is replaced with one or more of the following groups: hydroxyl, branched or straight chained saturated or unsaturated lower aliphatic, halogen, amide, ester, aldehyde, ketone, pyridyl, aryl, and combinations thereof. Formula 1 below depicts possible derivatized 2-pyrrolidinone compositions that can be used, in addition to the 1-(2-hydroxyethyl)-2-pyrrolidinone, in accordance with embodiments of the present invention:

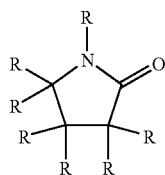

Formula 1

In Formula 1 above, each R can independently be H, hydroxyl, lower straight or branched aliphatic (including saturated and unsaturated lower aliphatic), halogen, amide, ester, aldehyde, ketone, pyridyl, aryl, and combinations thereof, with the proviso that at least one R is other than H. Combinations of such R groups can include, for example, hydroxyl lower aliphatic groups. Typically, most (or even only one) R groups can be H, though this is not required. However, it is desired to not derivatize the 2-pyrrolidinone such that it becomes completely insoluble in water. In one embodiment, the derivatized 2-pyrrolidinone can be non-ionic.

Examples of preferred derivatized 2-pyrrolidinone compositions that can be used along with the 1-(2-hydroxyethyl)-2-pyrrolidinone solvent include N-methyl-2-pyrrolidinone, 4-hydroxy-2-pyrrolidinone, 5-(hydroxymethyl)-2-pyrrolidinone, 1,5-dimethyl-2-pyrrolidinone, 1-(hydroxymethyl)-2-pyrrolidinone, 3,3,5-trimethyl-2-pyrrolidinone, and 5-methyl-2-pyrrolidinone.

One advantage of the solvent system of the present invention is that it is very compatible for use with salts, which are often used in the ink-jet ink arts to prevent bleed. In one embodiment, the ink-jet ink and method of the present invention can include the use of from 0.5 wt % to 8 wt % of an inorganic or organic salt. Examples of such salts that can be used include $Mg^{2+}(NO_3)_2^{2-}$, $Li^+NO_3^-$, $K^+NO_3^-$, $Na^+CH_3SO_3^-$, $Mg^{2+}SO_4^{2-}$, $Na^+NO_3^-$, and/or $Mg^{2+}(CH_3SO_3)_2^{2-}$. Through each salt is described alone above, it is understood that each of these specific salt descriptions covers its respective hydrated salt structures as well. For example, $Mg^{2+}(NO_3)_2^{2-}$ would include $Mg^{2+}(NO_3)_2^{2-}$·6H$_2$O. Thus, salted inks can be printed against other inks, such as pigmented inks, to reduce bleed, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.1 wt % to about 0.25 wt %.

One or more of various surfactants can also be used as are known by those skilled in the art of ink formulation. Non-limiting examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, commercial products such as TERGITOLS, SURFYNOLS, ZONYLS, TRITONS, MERPOLS, and combinations thereof. The amount of surfactant added to the ink-jet ink, if any, can range from 0 wt % to 10 wt %.

In one embodiment of the present invention, the ink-jet ink can be configured for application from a thermal ink-jet pen. Thermal ink-jet systems are quite different in their jetting properties than piezo ink-jet systems. As such, compositions that are effective for use in piezo ink-jet systems are not necessarily effective for use with thermal ink-jet ink systems. However, the converse is not necessarily true. In other words, compounds that work well with thermal ink-jet systems are more likely to work with piezo systems than vice versa. Therefore, the selection of liquid vehicle or other additives for use with thermal ink-jet systems often requires more care, as thermal ink-jet systems are typically less forgiving than piezo ink-jet systems.

In addition to plain paper, the ink-jet inks of the present invention are particularly useful when printing of so-called "photo media," such as media having an ink-receiving layer coated thereon. When referring to the ink-receiving layer of a print medium, this can include any coating that is used to accept an ink-jet ink to produce an image. There are at least two types of ink-receiving layers that can be used, including metal oxide or semi-metal oxide particulate-based ink-receiving layers, e.g., alumina- or silica-based, and polymeric swellable ink-receiving layers, e.g., gelatin or polyvinyl alcohol. The media substrate, for example, can be paper, plastic, coated paper, fabric, art paper, or other known substrate used in the ink-jet printing arts. In one embodiment, photobase can be used as the substrate. Photobase is typically a three-layered system comprising a single layer of paper sandwiched by two polymeric layers, such as polyethylene layers.

With respect to the ink-receiving layer, if a semi-metal oxide or metal oxide particulate-based ink-receiving layer is used; inorganic semi-metal or metal oxide particulates, a polymeric binder, and optionally, mordants and/or other porous coating composition agents can be present. In one embodiment, the inorganic semi-metal or metal oxide particulates can be silica, alumina, boehmite, silicates (such as aluminum silicate, magnesium silicate, and the like), titania, zirconia, calcium carbonate, clays, and combinations thereof. In a more detailed aspect, the particulates can be alumina, silica, or aluminosilicate. Each of these inorganic particulates can be dispersed throughout a porous coating composition, which can be applied to a media substrate to form the porous ink-receiving layer. The semi-metal oxide or metal oxide particulates can be chemically surface-modified using silane coupling agents having functional moieties attached thereto.

Turning to the organic swellable ink-receiving layer that can be coated on the media substrate, hydrophilic compositions such as gelatin, polyvinyl alcohol, methyl cellulose, or the like can be applied. These compositions are polymeric in nature, and when an ink-jet ink is printed thereon, the polymeric coating that makes up the ink-receiving layer absorbs and traps the ink. These hydrophilic polymeric materials can be coated on a single side of a media substrate, or can be coated on both sides of a media substrate to provide a good printing surface for ink-jet ink applications, as well as to provide balance to the back of the substrate, preventing substrate curl that may occur with a paper substrate. Backcoats can also be applied to the media to prevent ink-transfer when stacking media after printing. An example of such media is described in U.S. Pat. No. 6,638,585, which is incorporated herein by reference.

The ink-receiving layer, whether primarily inorganic porous or organic swellable, can be a single layer or a multilayer coating designed to adsorb or absorb sufficient quantities of ink to produce high quality printed images. The coating composition may be applied to the media substrate to form the ink-receiving layer by any means known to one skilled in the art, including blade coating, air knife coating, rod coating, wire rod coating, roll coating, slot coating, slide hopper coating, gravure, curtain, and cascade coating. The ink-receiving layer can be printed on one or both sides of the media substrate.

The following example illustrates embodiments of the invention that are presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what is presently deemed to be the most practical and preferred embodiment of the invention.

EXAMPLES

The following examples illustrate embodiments of the invention that are presently best known. However, other embodiments can be practiced that are also within the scope of the present invention. All of the ink-jet inks exemplified below had acceptable to excellent color attributes, and each exhibited at least acceptable recovery properties.

Example 1

A cyan ink-jet ink in accordance with principles of the present invention was prepared, including a liquid vehicle and a dye. The liquid vehicle included 10 wt % 1-(2-hydroxyethyl)-2-pyrrolidinone, 3 wt % of a non-ionic surfactant, and a balance of water. The dye used was Cyan 854, and when combined with the liquid vehicle, the pH was adjusted to 8.5. The amount of cyan dye used was an amount such that the ink had an absorbance of 0.18 based on a dilution of the ink at 1:10,000 by weight in an aqueous buffer solution of pH 10. The ink-jet ink was stable, and upon printing, produced a highly saturated cyan color.

Example 2

A magenta ink-jet ink in accordance with principles of the present invention was prepared, including a liquid vehicle and a dye. The liquid vehicle included 10 wt % 1-(2-hydroxyethyl)-2-pyrrolidinone, 3 wt % of a non-ionic surfactant, and a balance of water. The dye used was a magenta nickel azo dye, and when combined with the liquid vehicle, the pH was adjusted to 8.5. The amount of magenta dye used was an amount such that the ink had an absorbance of 0.18 based on a dilution of 1:10,000 by weight in deionized water. The ink-jet ink was stable, and upon printing, exhibited low puddling at the orifice plate and had acceptable saturation.

Example 3

A black ink-jet ink in accordance with principles of the present invention was prepared, including a liquid vehicle and a dye. The liquid vehicle included 10 wt % 1-(2-hydroxyethyl)-2-pyrrolidinone, 3 wt % of a non-ionic surfactant, and a balance of water. The dye used was Reactive Black 31, and when combined with the liquid vehicle, the pH was adjusted to 8.5. The amount of black dye used was amount such that the ink had an absorbance of 0.31 based on a dilution of 1:5,000 by weight in deionized water. The ink-jet ink was stable, and upon printing, had acceptable saturation.

Example 4

A cyan ink-jet ink in accordance with principles of the present invention was prepared. The solvents used for the ink-jet ink included 11 wt % 2-methyl-1,3-propanediol and 11 wt % 1-(2-hydroxyethyl)-2-pyrrolidinone. About 3.1 wt % Direct Blue 199 was also added to the ink-jet ink to provide its cyan color. The balance of the ink-jet ink was mostly water, but also contained minor amounts of known additives including 0.2 wt % buffer, 2 wt % nonionic surfactant, and 0.4 wt % anionic surfactant. The ink-jet ink produced was tested for decap properties and was rated excellent.

Example 5

A magenta ink-jet ink in accordance with principles of the present invention was prepared. The solvents used for the ink-jet ink included 11 wt % 2-methyl-1,3-propanediol and 11 wt % 1-(2-hydroxyethyl)-2-pyrrolidinone. About 0.75 wt % Acid Red 52 was also added to the ink-jet ink to provide its magenta color. The balance of the ink-jet ink was mostly water, but also contained minor amounts of known additives including 0.2 wt % buffer, 2 wt % nonionic surfactant, and 0.4 wt % anionic surfactant. The ink-jet ink produced was tested for decap properties and was rated excellent.

Example 6

A yellow ink-jet ink in accordance with principles of the present invention was prepared, including a liquid vehicle and a dye. The liquid vehicle included 10 wt % 1-(2-hydroxyethyl)-2-pyrrolidinone, 10 wt % diethylene glycol, 0.2 wt % buffer, 6 wt % magnesium nitrate hexahydrate, 1.5 wt % zwitterionic surfactant, and a balance of water. The dye used was Acid Yellow 23 sodium salt, and when combined with the liquid vehicle, the pH was adjusted to 7.5. The amount of yellow dye used was an amount such that the ink had an absorbance of 0.16 based on a dilution of 1:10,000 by weight in deionized water. The ink-jet ink was stable, and upon printing, had acceptable saturation.

Example 7

A cyan ink-jet ink in accordance with principles of the present invention was prepared, including a liquid vehicle and a dye. The liquid vehicle included 11 wt % 1-(2-hydroxyethyl)-2-pyrrolidinone, 11 wt % 2-methyl-1,3-propanediol, 1 wt % 3-pyridylcarbinol, 2 wt % of a non-ionic surfactant, 0.4 wt % ionic surfactant, 0.2 wt % buffer, and a balance of water. The dye used was Direct Blue 199 tetramethylammonium salt, and when combined with the liquid vehicle, the pH was adjusted to 8.5. The amount of cyan dye used was an amount such that the ink had an absorbance of 0.54 based on a dilution of 1:1,000 by weight in deionized water. The ink-jet ink was stable and exhibited excellent decap upon printing.

While the invention has been described with reference to certain preferred embodiments, those skilled in the art will appreciate that various modifications, changes, omissions, and substitutions can be made without departing from the spirit of the invention. For example, though specific minor amounts of additives are shown in the Examples, other additives or fewer additives can also be used. It is intended, therefore, that the invention be limited only by the scope of the following claims.

What is claimed is:

1. A pigment-free ink-jet ink, comprising:
   (a) an aqueous liquid vehicle including 1-(2-hydroxyethyl)-2-pyrrolidinone and an aliphatic polyhydric alcohol co-solvent;
   (b) a colorant consisting essentially of a dye that is solubilized in the aqueous liquid vehicle, wherein the colorant is a metallized dye or a plurality of dyes; and
   (c) from 0.5 wt % to 8 wt % of an inorganic or organic salt selected from the group consisting of $Mg^{2+}(NO_3)_2^{2-}$, $Li^+NO_3^-$, $K^+NO_3^-$, $Na^+CH_3SO_3^-$, $Mg^{2+}SO_4^{2-}$, $Na^+NO_3^-$, $Mg^{2+}(CH_3SO_3)_2^{2-}$, and mixtures thereof.

2. An ink-jet ink as in claim 1, wherein the colorant is present in the ink-jet ink at from 0.1 wt % to 20 wt %, and wherein substantially all of the colorant is solubilized in the aqueous liquid vehicle.

3. An ink-jet ink as in claim 1, wherein the aqueous liquid vehicle further includes at least one co-solvent selected from the group consisting of alcohols, ethers, esters, organosulfides, sulfones, thiols, ketones, aldehydes, carboxylates, amides, and amines.

4. An ink-jet ink as in claim 3, wherein the at least one co-solvent includes an ether.

5. An ink-jet ink as in claim 3, wherein the at least one co-solvent includes an amide.

6. An ink-jet ink as in claim 5, wherein the amide is 2-pyrrolidinone or derivatized 2-pyrrolidinone, with the proviso that the derivatized 2-pyrrolidinone is other than 1-(2-hydroxyethyl)-2-pyrrolidinone.

7. An ink-jet ink as in claim 6, wherein the amide is the derivatized 2-pyrrolidinone, and the derivatized 2-pyrrolidinone is nonionic.

8. An ink-jet ink as in claim 6, wherein the amide is the derivatized 2-pyrrolidinone, and wherein the derivatized 2-pyrrolidinone is selected from the group consisting of N-methyl-2-pyrrolidinone, 4-hydroxy-2-pyrrolidinone, 5-(hydroxymethyl)-2-pyrrolidinone, 1,5-dimethyl-2-pyrrolidinone, 1-(hydroxymethyl)-2-pyrrolidinone, 3,3,5-trimethyl-2-pyrrolidinone, 5-methyl-2-pyrrolidinone, and mixtures thereof.

9. An ink-jet ink as in claim 3, wherein the at least one co-solvent includes an amine.

10. An ink-jet ink as in claim 3, wherein the at least one co-solvent includes a carboxylate.

11. An ink-jet ink as in claim 1, wherein the colorant is the metallized dye.

12. An ink-jet ink as in claim 1, wherein the colorant is the plurality of dyes.

13. An ink-jet ink as in claim 12, wherein the colorant comprises at least one non-metallized dye.

14. An ink-jet ink as in claim 1, wherein the 1-(2-hydroxyethyl)-2-pyrrolidinone, the aliphatic polyhydric alcohol, and other co-solvent, if present, are collectively present in the ink-jet ink at from 10 wt % to 40 wt %.

15. An ink-jet ink as in claim 14, wherein the 1-(2-hydroxyethyl)-2-pyrrolidinone, the aliphatic polyhydric alcohol, and other co-solvent, if present, are collectively present in the ink-jet ink at from 15 wt % to 30 wt %.

16. A method of producing a printed image, comprising jetting an aqueous pigment-free ink-jet ink from an ink-jet pen, said ink-jet ink including:
   (a) an aqueous liquid vehicle including 1-(2-hydroxyethyl)-2-pyrrolidinone and an aliphatic polyhydric alcohol co-solvent;
   (b) a colorant consisting essentially of a dye that is solubilized in the aqueous liquid vehicle, wherein the colorant is a metallized dye or a plurality of dyes; and
   (c) from 0.5 wt % to 8 wt % of an inorganic or organic salt selected from the group consisting of $Mg^{2+}(NO_3)_2^{2-}$, $Li^+NO_3^-$, $K^+NO_3^-$, $Na^+CH_3SO_3^-$, $Mg^{2+}SO_4^{2-}$, $Na^+NO_3^-$, $Mg^{2+}(CH_3SO_3)_2^{2-}$, and mixtures thereof.

17. A method as in claim 16, wherein the step of jetting includes jetting the aqueous ink-jet ink onto media substrate having an ink-receiving layer coated thereon.

18. A method as in claim 17, wherein the ink-receiving layer is a metal oxide or semi-metal oxide particulate-based based coating.

19. A method as in claim 17, wherein the ink-receiving layer is a polymeric swellable coating.

20. A method as in claim 17 wherein the step of jetting includes jetting the aqueous ink-jet ink onto plain paper media substrate.

21. A method as in claim 16, wherein the colorant is present in the ink-jet ink at from 0.1 wt % to 20 wt %, and wherein substantially all of the colorant is solubilized in the aqueous liquid vehicle.

22. A method in claim 16, wherein the aqueous liquid vehicle further includes at least one co-solvent selected from the group consisting of alcohols, ethers, esters, organosulfides, sulfones, thiols, ketones, aldehydes, carboxylates, amides, and amines.

23. A method as in claim 16, wherein the colorant is the metallized dye.

24. A method as in claim 16, wherein the colorant is the plurality of dyes.

25. A method as in claim 24, wherein the colorant comprises at least one non-metallized dye.

26. A method as in claim 22, wherein the 1-(2-hydroxyethyl)-2-pyrrolidinone, the aliphatic polyhydric alcohol, and other co-solvent, if present, are collectively present in the ink-jet ink at from 10 wt % to 40 wt %.

27. A method as in claim 26, wherein the 1-(2-hydroxyethyl)-2-pyrrolidinone, the aliphatic polyhydric alcohol, and other co-solvent, if present, are collectively present in the ink-jet ink at from 15 wt % to 30 wt %.

* * * * *

UNITED STATES PATENT AND TRADEMARK OFFICE
CERTIFICATE OF CORRECTION

PATENT NO. : 7,204,872 B2  Page 1 of 1
APPLICATION NO. : 11/055907
DATED : April 17, 2007
INVENTOR(S) : Linda C. Uhlir-Tsang It is certified that error appears in the above-identified patent and that said Letters Patent is hereby corrected as shown below:

In column 3, line 39, delete "is" before "aliphatic".

In column 4, lines 47-48, after "ethylene glycol" delete "alkcyl" and insert -- alkyl --, therefor.

In column 4, line 48, after "propylene glycol" delete "alkcyl" and insert -- alkyl --, therefor.

In column 4, line 49, delete "alkylethers" and insert -- alkyl ethers --, therefor.

Signed and Sealed this

Twenty-second Day of June, 2010

David J. Kappos
*Director of the United States Patent and Trademark Office*